United States Patent
Truong et al.

(10) Patent No.: US 9,680,365 B2
(45) Date of Patent: Jun. 13, 2017

(54) SYSTEMS AND METHODS OF OVER-LOAD PROTECTION WITH VOLTAGE FOLD-BACK

(75) Inventors: Tom Truong, Lewisville, TX (US); John Vogt, Denton, TX (US)

(73) Assignee: Texas INsturments Incorporated, Dallas, TX (US)

( * ) Notice: Subject to any disclaimer, the term of this patent is extended or adjusted under 35 U.S.C. 154(b) by 357 days.

(21) Appl. No.: 13/295,638

(22) Filed: Nov. 14, 2011

(65) Prior Publication Data

US 2013/0120891 A1 May 16, 2013

(51) Int. Cl.
| | |
|---|---|
| H02H 3/08 | (2006.01) |
| H02M 1/32 | (2007.01) |
| H02M 3/158 | (2006.01) |
| H02M 1/00 | (2006.01) |

(52) U.S. Cl.
CPC .............. *H02M 1/32* (2013.01); *H02M 3/158* (2013.01); *H02M 2001/0025* (2013.01)

(58) Field of Classification Search
USPC ......................................................... 361/93.9
See application file for complete search history.

(56) References Cited

U.S. PATENT DOCUMENTS

| | | | | |
|---|---|---|---|---|
| 5,666,044 | A * | 9/1997 | Tuozzolo | 323/277 |
| 7,843,178 | B1 * | 11/2010 | Houk | H02M 1/36 323/222 |
| 7,868,595 | B1 * | 1/2011 | Smith | H02M 1/36 323/222 |
| 2004/0095111 | A1 * | 5/2004 | Kernahan | H02M 3/157 323/282 |
| 2006/0012932 | A1 * | 1/2006 | Kitagawa | H03K 17/0822 361/93.1 |
| 2008/0062586 | A1 * | 3/2008 | Apfel | 361/18 |
| 2010/0263895 | A1 * | 10/2010 | Bosch | H02M 1/44 173/217 |
| 2012/0091978 | A1 * | 4/2012 | Ishii | 323/271 |
| 2013/0120891 | A1 * | 5/2013 | Truong | H02M 1/32 361/93.9 |

* cited by examiner

*Primary Examiner* — Ronald W Leja
(74) *Attorney, Agent, or Firm* — William B. Kempler; Charles A. Brill; Frank D. Cimino

(57) ABSTRACT

In a typical DC-DC converter, an error amplifier is used to sense and amplify the difference between the feedback voltage and the reference voltage. In the event of current overloading (limit condition), example embodiments of the disclosed systems and methods of over-load protection with voltage fold-back fold back the reference voltage proportional to the current limit. The regulator may continue to regulate in this fold-back voltage reference condition without shutting down the converter, saturating the inductor, or causing a catastrophic failure at the power FETs. The disclosed systems and methods of over-load protection with voltage fold-back resolve consecutive switching cycle current build up in high input voltage DC/DC convertor applications due to the latency of current limit circuitry.

18 Claims, 4 Drawing Sheets

SYSTEMS AND METHODS OF OVER-LOAD PROTECTION WITH VOLTAGE FOLD-BACK

TECHNICAL FIELD

The present disclosure is generally related to electronics and, more particularly, is related to voltage regulators.

BACKGROUND

Although features and functionality attract the most attention for new electronic products, whether consumer, industrial, or medical, their reliability depends on protecting their power systems from overcurrent events. Internal, external, and nuisance threats can affect circuit and system reliability. Through proper overcurrent protection, designers can minimize risks and failures so that an electronic product retains its competitive edge. There are heretofore unaddressed needs with previous solutions.

SUMMARY

Example embodiments of the present disclosure provide systems of over-load protection with voltage fold-back. Briefly described, in architecture, one example embodiment of the system, among others, can be implemented as follows: a voltage reference configured to receive a current limit signal, the current limit signal indicating a state of an output current of a voltage regulator, the output voltage of the voltage regulator proportional to an output voltage of the voltage reference, the output voltage of the voltage reference configured to foldback when the current limit signal indicates an overcurrent condition.

Embodiments of the present disclosure can also be viewed as providing methods for over-load protection with voltage fold-back. In this regard, one embodiment of such a method, among others, can be broadly summarized by the following steps: receiving a current limit signal indicative of an overcurrent condition of a voltage regulator; and folding back a reference voltage of the voltage regulator.

DETAILED DESCRIPTION

Figure 1:
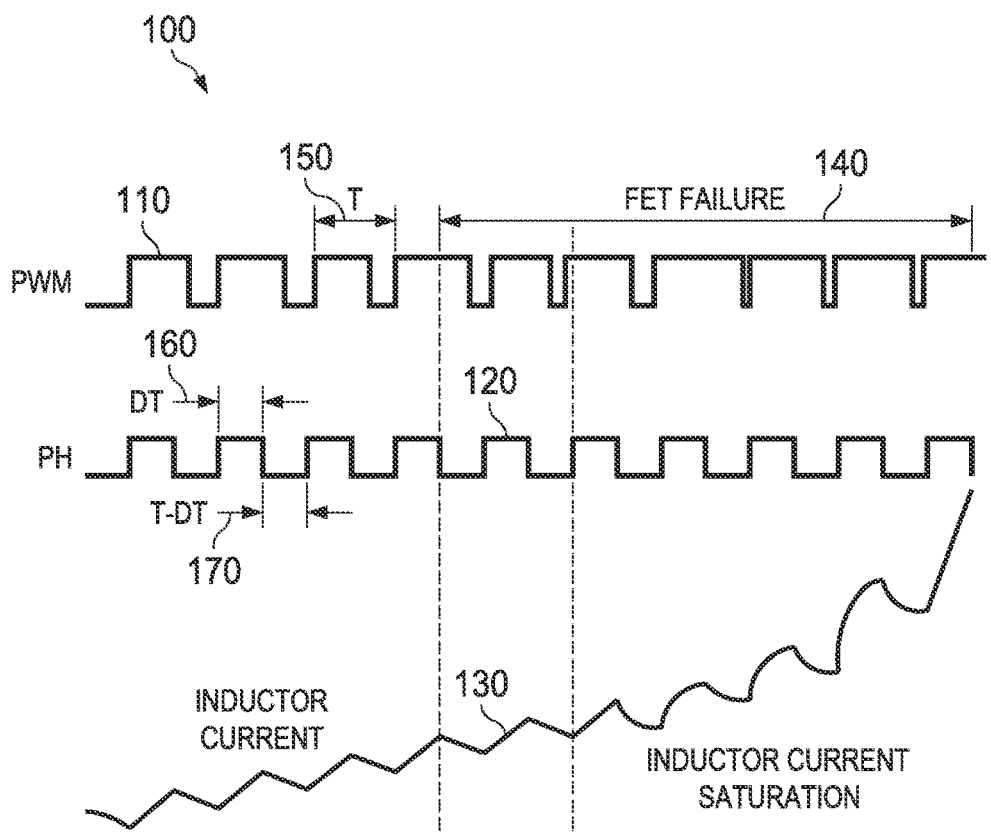
FIG. 1 is a signal diagram of an example DC-DC converter.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

There are many overcurrent methods for protecting electrical and electronic devices to prevent excessive current from causing damage or starting fires. Overcurrent protection methods may both protect components, equipment and people from risk of fire and electric shock and isolate sub-systems from the main system.

There are two types of overcurrent events: 1) overload—simply drawing excessive current beyond the designed capacity of the circuit, and 2) short-circuit, or fault current. Time-delay overcurrent protection methods have a time-delay mechanism. They are designed to protect only on an excessive current draw for a defined period of time and are typically used to protect inductive and capacitive loads that experience heavy current draws upon initial powering. The time delay action prevents the overcurrent protection method from needlessly asserting during a temporary heavy current draw or surge. Time-delay methods tolerate higher inrush currents than fast-acting methods and are often ideal for dc-dc converter input protection, as most converters have an input capacitor that draws a large amount of current when initially charged.

Selecting the right overcurrent protection method is critical in all electronic and electrical system designs. Catastrophic system failure can be prevented with the proper overcurrent protection method on the DC-DC converter input. In the event the converter's internal circuitry can no longer withstand an overload condition, the overcurrent protection method may prevent fire or further damage to the board, the converter, or neighboring components. Most DC-DC converters are protected from short-circuits on their outputs by either circuit-sensing current limit and/or thermal overload circuits.

Proper selection of an overcurrent protection method for a dc-dc converter involves understanding and consideration of the following factors: voltage rating, current rating, interrupting rating, temperature derating, maximum circuit fault current, required agency approvals, and mechanical considerations. Overcurrent protection methods may be rated by the AC and/or DC circuit voltage into which they can be safely applied. An overcurrent protection method installed in an AC circuit may perform differently than when installed in a DC circuit. With AC circuits, the current is crossing the zero potential at 60 or 50 cycles a second. In DC circuits, the voltage does not go to a zero potential, making it more difficult to suppress an overcurrent condition.

Although some power supplies are designed for constant current output regulation, most typical DC-DC converters are designed as constant power devices. This means that as the input voltage drops, the input current must increase to uphold the constant output power relationship of P=V*I. The minimum current rating of the overcurrent protection method may be determined by the maximum input current of the DC-DC converter. Typically, the maximum current consumption occurs at the maximum output load and the minimum input voltage. The magnitude of the input current can be determined from: $I_{INPUT(MAX)} = P_{OUT(MAX)}/V_{IN(MIN)} \times$ Efficiency where: $P_{OUT(MAX)}$=maximum DC-DC converter output power, $V_{IN(MIN)}$=minimum input voltage on the dc-dc converter input, Efficiency=Efficiency of DC-DC converter at $P_{OUT(MAX)}$ and $V_{IN(MIN)}$, which can be determined from the DC-DC converter's datasheet.

To prevent damage to converter components, the overcurrent protection method current rating may be selected with a large enough current capability so that the overcurrent protection method will not operate under steady state conditions, yet will operate during an abnormal (excessive) overload or short-circuit condition. Usually this results in selecting a overcurrent protection level to be 150% to 200% percent of the maximum steady state input current at maximum load and minimum line input voltage.

The DC-DC converter peak inrush current is usually significantly greater than the steady state current. The task of a system designer is to select an overcurrent protection method with the minimum overcurrent protection level energy of the inrush current pulse. This rating ensures that the overcurrent protection method will not cause a nuisance operation during transient conditions.

Other selection considerations include start-up (inrush) currents and transient load conditions. When a DC-DC converter is initially powered, the input bulk capacitors of dc-dc must be charged. Current flowing into the input terminals of a dc-dc converter is approximately I=V/R for typical power supplies with charge times less than 10 milliseconds, where V is the input voltage change, and R is a combination of wiring resistance, the resistance of the source under start-up, and the Equivalent Series Rating (ESR) of the converter's input bulk capacitors.

Larger DC-DC converters often use a large capacitor with very low ESR inside the converter. The overcurrent protection method should be selected properly to allow these inrush current pulses to pass without nuisance openings. To calculate current pulse energy, one must first determine the magnitude and duration of the current pulse. The most accurate way to determine parameters of a current pulse is to measure this current in the application under minimum and maximum voltage conditions. For example, the steady state current is maximum at low line so a transient load surge needs to be added to the low line current to establish the maximum peak current for an operating condition. But the inrush current is usually maximum at the highest input voltage.

Over current loading may cause inductor saturation and device failure on DC-DC converters. A potential cause may include a cycle by cycle current limiting circuit failure to limit current from the power FET to the inductor in a high voltage application due to the long response delay of the cycle by cycle limit circuit. The response time of the current limiting circuit may be shortened as the input voltage increases for a given DC-DC converter configuration. For a very high input voltage, the required response time of the current limiting circuit is not practical, as it may approach the sub nanosecond range. FIG. 1 provides graph 100, which illustrates a condition in which a current limiting circuit is ineffective and leads to eventual device failure due to overcurrent stress.

Current limiting methods may be difficult to design in practice because they tend to it shut down the power every cycle. In a DC-DC converter, the PWM signal is supposed to turn on the high side FET and the low side FET. Once the PWM pulse train is sent in normal regulation, a switching signal is present at the high side FET node. If there is current limit protection, the signal at the high side FET node should be truncated or shortened. If the current limit protection turns the high side FET off, then the PWM signal at the high side FET node will be short. It keeps ramping every cycle because there is a minimum on-time.

There's always a minimum on-time because even in current limit, there's a propagation delay and blanking time to stop the circuit from getting noisy from false triggers. So a minimum on-time is typically designated from these delays. In general, this process is applicable to any typology.

For any typology, in practice, there is some delay before it can be turned off. The delay may be expressed in terms of the duty cycle where the DT is the minimum on-time, where T is the period. A voltage is present at the inductor when the high side FET is on. This condition exists for basically any typology. Under the safe operating conditions of a typical DC-DC converter circuit, a certain number of clock cycles are recommended before shut down in a over-current condition. In this condition, the circuit may be permanently shut down. However, in some applications, it is not desirable to shut down the entire part. To solve this problem, multiple current pulses may be counted before shutting down the circuit. In an example circuit, this may be implemented using a current detect signal.

In FIG. 1, the input voltage is too high for current limiting circuit to be effective.

$$V_{L(HS\_ON)} > \left(\frac{T - DT}{DT}\right) * |V_{L(LS\_ON)}|$$

where VL(HS_ON) is the voltage of the inductor when HS FET is on during phase DT; VL(LS_ON) is the voltage of the inductor when LS FET is on during phase T-DT; DT is the truncated duty-cycle in current limit operation (minimum response time to turn off power FET); and T is the period of PWM signal.

The alternative is to power down the device in the event of over current limit or a multiple of current limit events. The problem of inductor saturation, due to current limit latency and eventual device failure in DC-DC converters, can be solved with the disclosed systems and methods of over-load protection with voltage fold-back.

In a typical DC-DC converter, an error amplifier is used to sense and amplify the difference between the feedback voltage and the reference voltage. In the event of current overloading (limit condition), example embodiments of the disclosed systems and methods of over-load protection with voltage fold-back fold back the reference voltage proportional to the current limit. The regulator continues to regulate in this fold-back voltage reference condition without shutting down the converter, saturating the inductor, or causing a catastrophic failure at the power FETs. The disclosed systems and methods of over-load protection with voltage fold-back resolve consecutive switching cycle current build up in high input voltage DC/DC convertor applications due to the latency of current limit circuitry.

Figure 2:
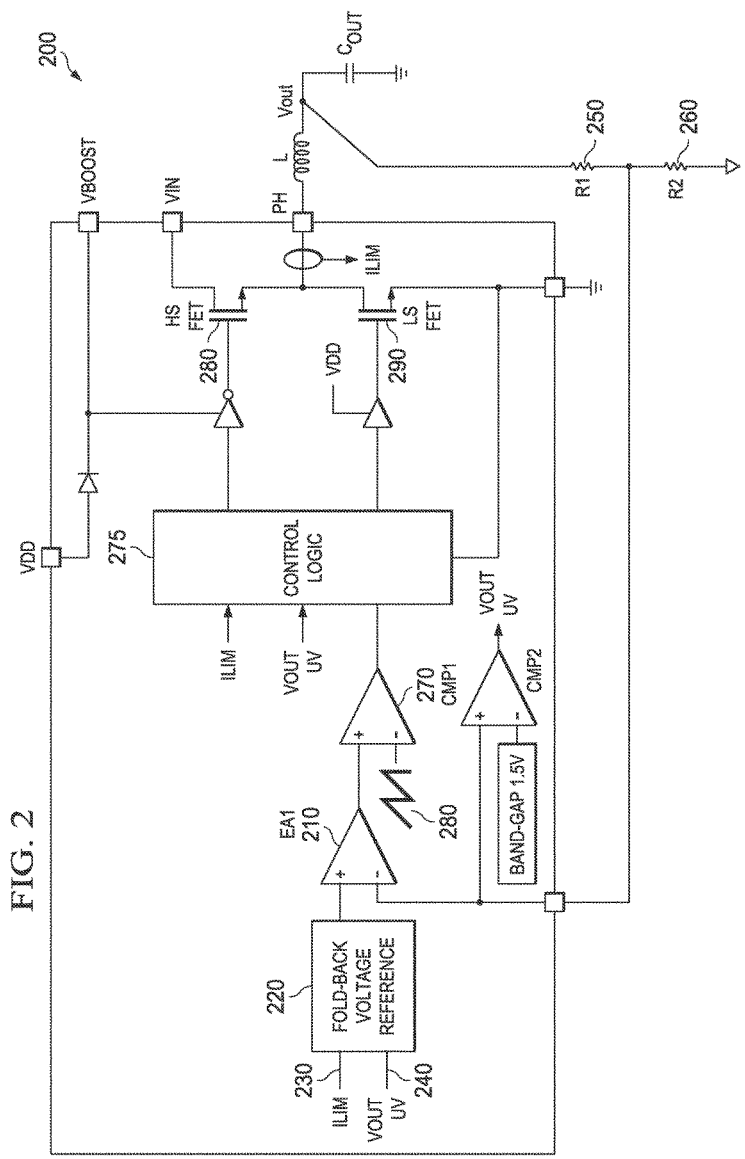
FIG. 2 is a circuit diagram of an example embodiment of a system of over-load protection with voltage fold-back.

FIG. 2 provides a circuit diagram 200 of a typical DC-DC converter with an example embodiment of the disclosed systems and methods of over-load protection with voltage fold-back. Circuit diagram 200 includes control logic 275 for driving high side FET 280 and low side FET 290. Typically a band-gap voltage reference would be connected to the positive input of error amplifier 210. However, in an example embodiment of the disclosed systems and methods of over-load protection with voltage fold-back, fold-back circuit 220 is connected to error amplifier 210. Fold-back circuit 220 may be used in one of at least two modes of operation—soft start-up and regulation mode.

In soft-start mode, the non-inverting input of operational amplifier 210 ramps from zero volts to final value. The final value is determined by the regulated output Vout and resistor divider R1 250 and R2 260. In soft-start mode, the Vout ramps up with a rate that tracks the ramp rate of the non-inverting input of operational amplifier 210. This allows a controlled charge up rate for Cout. In regulation mode, the non-inverting input of operational amplifier 210 is set to a fixed band-gap voltage. This band-gap voltage and the resistor divider set by R1 250 and R2 260 determine the regulated Vout.

In an example embodiment, error amplifier 210 amplifies the difference in the signals between the fold-back block 220 and the output feedback divided down by resistor divider of R1 250 and R2 260. The output of error amplifier 210 is then compared to ramp 280 by comparator 270 to generate the PWM signal. Control logic block 275 passes the PWM signal to drive high-side FET 280 and low-side FET 290. ILIM 230 and VOUT UV 240 may be used to determine the fold back level in fold-back block 220.

Figure 3:
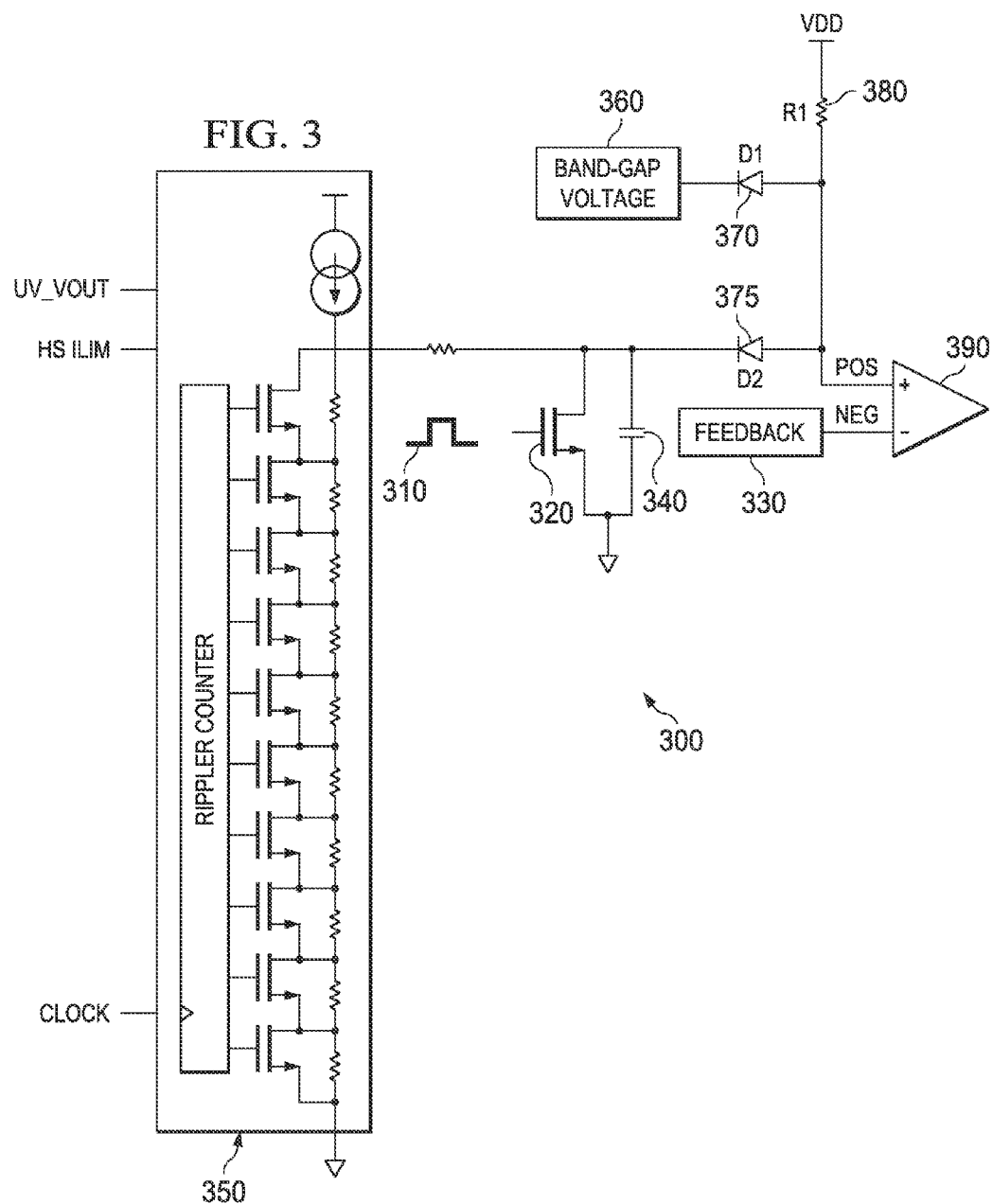
FIG. 3 is a circuit diagram of an example embodiment of the fold-back voltage reference of FIG. 2.

FIG. 3 provides circuit 300 of an example embodiment of the fold-back block of FIG. 2. Circuit 300 includes switch 320, feedback 330, capacitor 340, digital to analog converter (DAC) 350, band-gap voltage 360, diodes 370 and 375, pull-up resistor 380, and error amplifier 390. Current limit pulse 310 is proportional to a current limit signal and the PWM duty cycle. Switch 320 discharges capacitor 340 during current limit to fold back the voltage reference. Voltage feedback 330 senses the output voltage generated from external resistor divider R1 250 and R2 260 from FIG. 2. Capacitor 340 filters and stores charge from the fold-back voltage. Capacitor 340 is discharged with the current limit pulse resulting in the folding back of the reference voltage.

DAC 350 generates a voltage reference during soft start and normal operation. In an example embodiment, DAC 350 comprises a ripple counter and a resistor ladder. The ripple counter is used to generate a control ramp based on counting clock cycles during a soft start mode. The impedance of the resistor ladder is increased with each clock cycle. When the final state is reached, at which the counter reaches a maximum count and all switches are turned off, the impedance of the ladder is the sum of all the resistors.

A current is applied on the resistor ladder, which results in the voltage reference applied to error amplifier 390. In an example embodiment, band-gap voltage 360 is used to clamp the non-inverting input of the operational amplifier 390 to an accurate voltage reference. Diodes 370 and 375 allow the passing the lower reference (band-gap or DAC ouput) to error amplifier 390. Resistor 380 provides a weak pull up to bias diodes 370 and 375. Error amplifier 390 regulates the output feedback signal to the voltage reference at the non-inverting node.

In a typical circuit, a band-gap reference and a filter may be used for a DC-DC reference voltage. However, in the disclosed systems and methods of over-load protection with voltage fold-back, the filter cap is discharged. In an example embodiment, DAC 350 includes a start-up module using a flip-flop to set a count. The count may be a binary count upward with a current source for biasing the resistor ladder. When the count is counting 1 to 1000, for example, for one microsecond clock, it would count in one microsecond steps up to a thousand. Incrementally, the switches in DAC 350 open and allow the current to bias the voltage output so it will incrementally ramp up depending on the count. This implements a soft start function.

The same current limit signal may be fed into a logic portion of DAC 350, which resets the counter. The counter may be implemented such that it does not always reset to zero volts. The counter may have a break-point that may be set to multiples of a break-point value, such as 25%, 50%, 75%, etc. In an example embodiment, to set the break-point values, logic gates are used to set the count value of ripple counter 350. For example, a 10 bit ripple count counts up to 1024. To set a break-point value at 25%, logic gates are used to reset the count to 256. Anytime the output voltage exceeds 25%, and an over-current condition occurs, then the output voltage of the reference folds back to 25%. In this example embodiment, the reference voltage will fall back to the last breakpoint that was set and not to zero volts, resulting in the monotonicity of the self-start ramp. Instead of dropping back to zero volts, the reference voltage is folded back to appear monotonic. In an example embodiment, an under-voltage detector may be used to reset the reference output to zero volts if the output voltage is pulled to ground. In this condition, the soft-start would reset to zero. The voltage reference circuit is reset and a soft-start ramp starts again from zero volts.

Band-gap reference 360 is used in a steady state condition. Diodes 370 and 375 select the reference applied to the non-inverting input of operational amplifier 390. Diodes 370 and 375 select the lower voltage, so that if the reference voltage is soft-starting from zero, the output voltage starts at ground. If the output voltage starts at ground and band-gap reference 360 is at 2.5 volts, then diode 370 would block any voltage from going to the POS node of the amplifier because that voltage is higher than the non-inverting node. But for the soft-start circuit, when the reference voltage starts at zero, diode 375 pulls the non-inverting node down to 0.6 volts, for example, or whatever the diode drop is but selecting the lower of the two signals from the band-gap voltage and the output of DAC 350. In an example embodiment, a signal may indicate that soft-start ramping is completed. For example, it may ramp to seven volts. If multiple current pulses are sensed during the ramping, the output voltage may be folded back all the way to ground. In this example implantation, capacitor 340 is discharged to ground.

Figure 4:
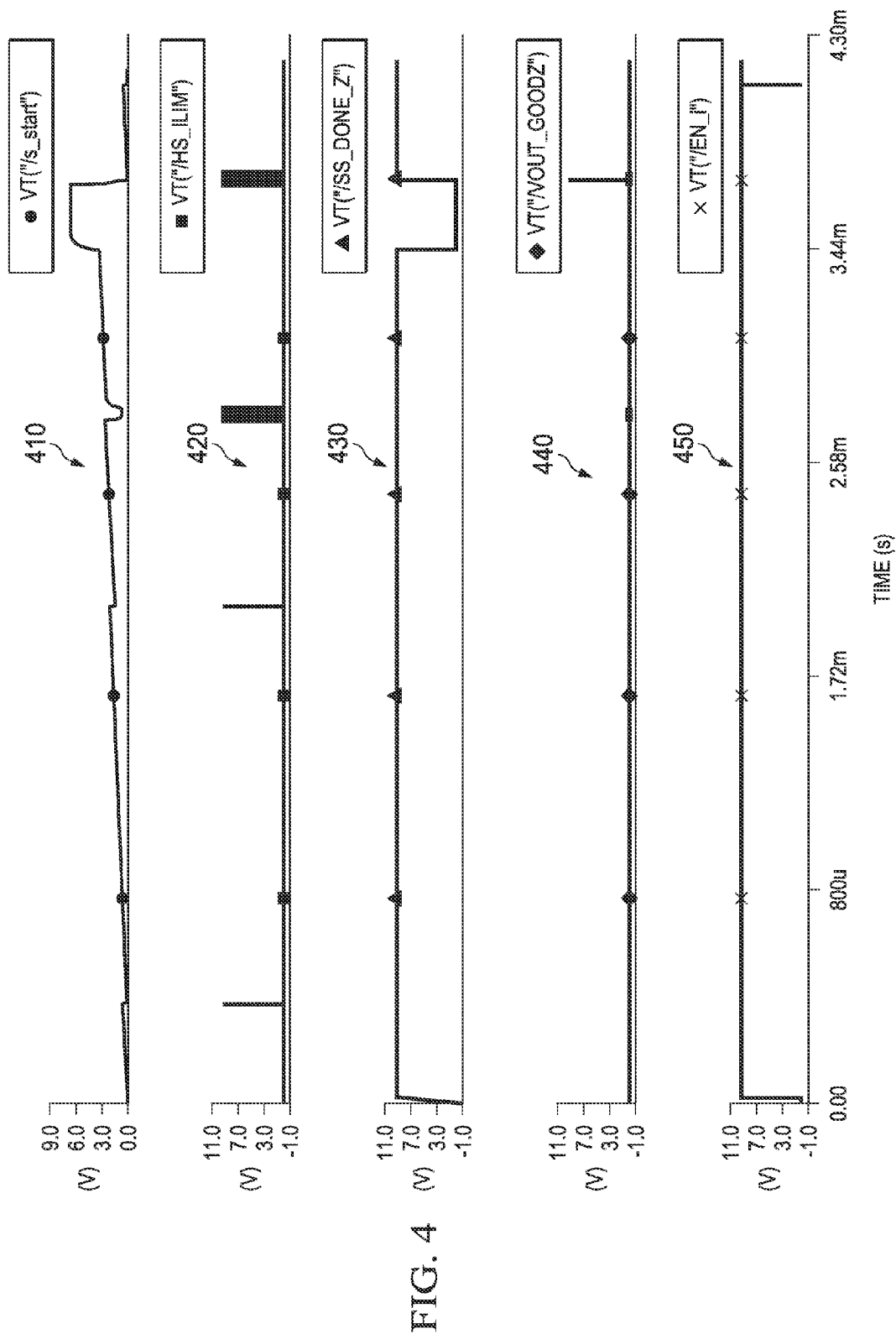
FIG. 4 is a signal diagram of an example embodiment of the fold-back voltage reference of FIG. 2.

FIG. 4 provides a graph of the fold-back block operating in fold back mode. In an example embodiment, a current limit pulse results in the folding back of the voltage of the DAC. During soft-start the fold back voltage may be set by the counter depending on the voltage reference ramp level. For example, if the fold back level is set at step increments of 10% from zero to full ramp, a current limit pulse during soft-start would fold the reference voltage ramp down to 50% level if the ramp has reached 55%. In an example embodiment, to set the reference to 50%, logic gates are used to reset the ripple counter to 512 for a 10 bit counter. The VOUT UV may be valid only after soft-start done is complete. In an example embodiment, when a VOUT UV transition occurs, the reference voltage is folded back to zero volts.

The waveforms of FIG. 4 provide example signals related to the fold back block 220 of FIG. 2 in response to ILIM and VOUT UV signals. Waveforms include fold back voltage reference from DAC 350, soft start signal 410, current limit pulse 420 (HS_ILIM), inverted soft-start done signal 430 (SS_DONE_Z), inverted VOUT UV signal 440 (VOUT_GOODZ), and enable signal 450 (EN_i). In the example signals of FIG. 4, soft-start signal 410 starts at zero. Diode 375 pulls it down. When soft-start signal 410 ramps up and the current limit signal 420 switches hits during the soft-start ramp, the counter in DAC 350 resets to zero and resets soft-start signal 410 to zero. When soft-start signal 410 ramps up to more than 25%, it doesn't fold back to zero at the second current limit occurrence; instead, it back to 25%. In a situation in which multiple current limit pulses occur, capacitor 340 is discharged to ground. However, the soft-start doesn't go all the way to ground; soft-start signal 410 is only folded back to 25%. Capacitor 340 is discharged to ground and the counter gets reset. When VOUT UV signal

440 is triggered, soft-start signal 410 is reset. Enable signal 450 may be used to enable or disable the circuit.

Figure 5:
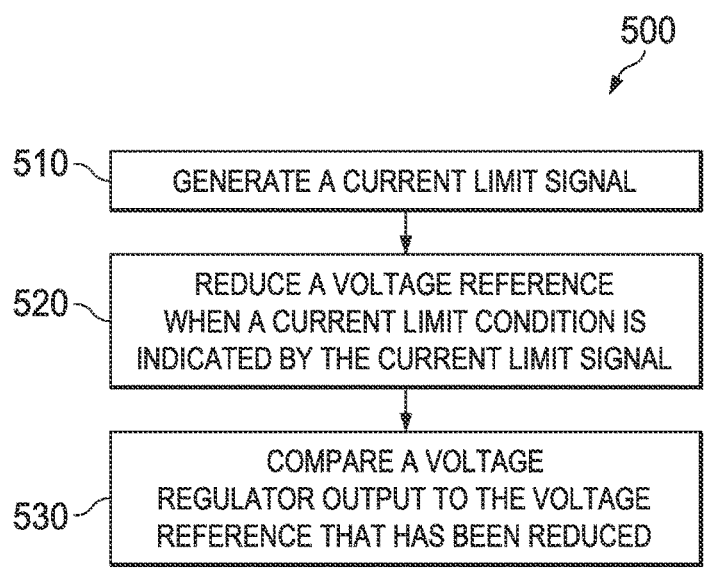
FIG. 5 is a flow diagram of an example embodiment of a method of over-load protection with voltage fold-back.

FIG. 5 provides flowchart 500 of an example embodiment of a method of over-load protection with voltage fold-back. In block 510, a current limit signal is generated. This current limit signal may be generated, as a non-limiting example, at the output of a DC-DC converter. In block 520, a voltage reference is reduced when a current limit condition is indicated by the current limit signal. In block 530, the reduced voltage reference is compared to feedback from an output of a voltage regulator, such as the DC-DC converter.

This solution provides short-circuit survivability, load transient, and fail safe protection without undesired power off or re-start conditions. It also provides a efficient silicon solution for current limit without depending on cycle by cycle current limit latency. Additionally, the solution provides continual regulation over spurious and current limit events.

Although the present disclosure has been described in detail, it should be understood that various changes, substitutions and alterations can be made thereto without departing from the spirit and scope of the disclosure as defined by the appended claims.

Therefore, at least the following is claimed:

1. A DC-DC converter having fold-back current limiting comprising:
  a voltage reference controlling an output voltage of the DC-DC converter, the voltage reference generating a reference voltage which increases over time from a break-point value to a final value, the voltage reference being operable in a first mode wherein the reference voltage starts from a first break-point value at substantially 0V and ramps to a final value to provide a soft-start for the DC-DC converter and being operable in a second mode in which the break-point value of the reference voltage is reset by a current limit logic circuit from the final value to a second break-point value, the second break-point value being set to one of a plurality of multiples of the final value, whereby a single voltage reference is utilized for both soft-start operation of the DC-DC converter and fold-back current limiting of an output.

2. The DC-DC converter of claim 1, wherein the DC-DC converter is configured with break-point levels, an output voltage of the voltage reference is configured to fold back to a last breakpoint that was set by the current limit logic circuit.

3. The DC-DC converter of claim 1, wherein the voltage reference comprises:
  a capacitor configured to store charge of a fold-back voltage;
  a digital to analog converter (DAC) configured to generate an output voltage of the voltage reference; and
  an error amplifier configured to regulate the output voltage of the voltage reference.

4. The DC-DC converter of claim 3, wherein the DAC comprises a ripple counter configured to generate a control ramp, the control ramp based on a count of the ripple counter.

5. The DC-DC converter of claim 4, wherein the DAC further comprises a resistor ladder, an impedance of the resistor ladder increasing with each count of the ripple counter.

6. The DC-DC converter of claim 1, where a current limit signal indicating a state of an output current of a voltage regulator is proportional to current limit and a pulse width modulation duty cycle.

7. The DC-DC converter of claim 1 wherein fold-back current limiting is initiated when the output voltage exceeds the break-point value and an over-current condition occurs.

8. The DC-DC converter of claim 7 wherein when an over-current condition occurs, the output voltage of the voltage reference folds back to the second break-point.

9. A method comprising:
  receiving a current limit signal indicative of an overcurrent condition of a DC-DC converter;
  configuring the DC-DC converter with a plurality of foldback levels, and configuring an output voltage of a voltage reference to fold back to a last breakpoint that was set by a current limit logic circuit;
  further comprising:
  configuring a capacitor to store charge of a foldback voltage;
  configuring a digital to analog converter (DAC) to generate the output voltage of the voltage reference; and
  configuring an error amplifier to regulate the output voltage of the voltage reference.

10. The method of claim 9, further comprising configuring the DAC with a ripple counter to generate a control ramp, the control ramp based on a count of the ripple counter.

11. The method of claim 9, further comprising configuring the DAC with a resistor ladder, such that the impedance of the resistor ladder increases with each count of a ripple counter.

12. The method of claim 9, further comprising configuring the current limit signal to be proportional to a current limit and a pulse width modulation duty cycle.

13. In a DC-DC converter, a voltage reference configured to fold back its output voltage based on a received current limit signal, the voltage reference comprising:
  an operational amplifier with an inverting input and a non-inverting input;
  feedback electrically connected to the inverting input of the operational amplifier; and
  a digital to analog converter (DAC) circuit electrically connected to the non-inverting input of the operational amplifier, the DAC circuit generating a reference voltage which increases over time from a break-point value to a final value, the voltage reference being operable in a first mode wherein the reference voltage starts from a first break-point value at substantially 0V and ramps to a final value to provide a soft-start for the DC-DC converter and being operable in a second mode in which the break-point value is reset from the final value by a current limit logic circuit to a second break-point value, the second break-point value being set to one of a plurality of multiples of the final value, whereby a single voltage reference is utilized for both soft-start operation of the DC-DC converter and foldback current limiting of an output.

14. The voltage reference of claim 13, wherein the current limit signal is received from a voltage regulator.

15. The voltage reference of claim 13, wherein the DAC comprises a ripple counter and a resistor ladder.

16. The voltage reference of claim 13, wherein the output voltage of the DAC increases in proportion to a clock input to perform a soft-start function.

17. The voltage reference of claim 13, further comprising a band gap voltage reference electrically connected to the non-inverting input of the operational amplifier.

18. The voltage reference of claim 13, further comprising a capacitor configured for charging by the DAC and a switch configured to discharge the capacitor.

* * * * *